United States Patent [19]

Boutin et al.

[11] Patent Number: 4,504,643
[45] Date of Patent: Mar. 12, 1985

[54] (METH)ACRYLIC ACID/METHALLYLSULFONATE COPOLYMERS

[75] Inventors: Jean Boutin, Mions; Jean Neel, Lyon both of France

[73] Assignee: Rhone-Poulenc Industries, Paris, France

[21] Appl. No.: 474,562

[22] Filed: Mar. 11, 1983

Related U.S. Application Data

[63] Continuation of Ser. No. 267,754, May 28, 1981, abandoned.

[30] Foreign Application Priority Data

Jun. 9, 1980 [FR] France ................................ 80 12741

[51] Int. Cl.³ ............................................ C08F 228/02
[52] U.S. Cl. ...................................... 526/287; 526/91
[58] Field of Search ........................................ 526/287

[56] References Cited

U.S. PATENT DOCUMENTS 3,706,717 12/1972 Siegele .................................. 526/287
4,118,439 10/1978 Marze .................................. 526/287

Primary Examiner—Christopher A. Henderson
Attorney, Agent, or Firm—Burns, Doane, Swecker & Mathis

[57] ABSTRACT

Water-soluble (meth)acrylic acid/methallylsulfonate copolymers, containing less than 20% by weight of the methallylsulfonate comonomer, are well suited as scale inhibitors for aqueous environments, especially those comprising essentially equal amounts by weight of both acrylic and methacrylic acids.

3 Claims, No Drawings

(METH)ACRYLIC ACID/METHALLYLSULFONATE COPOLYMERS

This application is a continuation of application Ser. No. 267,754, filed May 28, 1981, now abandoned.

BACKGROUND OF THE INVENTION

1. Field of the Invention

The present invention relates to novel water-soluble (meth)acrylic acid/methallylsulfonate copolymers, and to the use thereof as scale inhibitors for aqueous environments.

2. Description of the Prior Art

It is known to this art that the breakdown of the calcium carbonate equilibrium in water by heating, degassing or increasing the pH thereof gives rise to the formation of encrusting deposits of alkaline earth metal carbonates on the walls of water-confining vessels, or in the piping comprising the various cooling circuits or boilers. As the thermal conductivity of these deposits is incomparably lower than that of metals, there is a marked loss in the heat exchange capacities of such systems with concomitant loss or waste of energy. It is, therefore, obviously necessary to prevent the formation of the aforesaid encrusting deposits, commonly referred to as scale.

And to date numerous means have been proposed for preventing scaling, for example:

(i) Partial or total removal of the calcium and magnesium in the water, before use, by means of ion exchange or decarbonation with lime; or (ii) Addition of an acid agent to the water in the circuit; or also (iii) Addition of agents which sequester the calcium and magnesium ions.

However, these processes are expensive and can also themselves present disadvantages, such as corrosion. Therefore, preference is frequently given to a more economical and well-known process which consists in adding water-soluble chemical additives, in proportions which are typically between 0.2 and several tens of mg/liter, to the hard water; these additives which are more commonly referred to as scale inhibitors, exert their influence on the formation of crystals. They disturb or disrupt their growth such that precipitation is retarded and the encrustation, if any indeed be produced, is rendered brittle.

Stated differently, by adding homeopathic amounts of chemical additives to the water, the scaling of the heat exchangers is retarded.

Some of these adjuvants, such as (1) the alkali metal polyphosphates, have been known for such purpose for a very long time; but same exhibit the disadvantage of hydrolyzing to orthophosphates, whereupon their scale-inhibiting attributes vanish, and precipitation of alkaline earth metal orthophosphates also takes place, which leads to a result diametrically opposed to that desired.

Other additives have also been similarly employed, such as:

(2) Phosphonic and polyphosphonic acids, which may or may not contain nitrogen, and their alkali metal salts;

(3) Low molecular weight homopolymers of acrylic acid or methacrylic acid and the corresponding alkali metal salts thereof;

(4) Low molecular weight copolymers of acrylic acid and methacrylic acid and the corresponding alkali metal salts thereof;

(5) Very low molecular weight homopolymers of maleic acid and its salts, and copolymers thereof; and (6) 1000 to 25,000 molecular weight water-soluble copolymers of a monovinyl comonomer, e.g., (meth)acrylic acid, and a major amount of a vinyl sulfonate comonomer (as "below 25 mol percent the copolymer is no longer suitably effective in acid conditions of pH 3 or in the presence of useful amounts of zinc"), or salt form thereof; see U.S. Pat. No. 3,706,717.

Moreover, it too will be appreciated that the aforesaid list is by no means exhaustive.

It has also been determined, in particular, that polymers of ethylenic diacids, such as maleic acid, are better inhibitors of the precipitation of calcium and magnesium scales than are the homopolymers or copolymers of ethylenic monoacids, such as acrylic or methacrylic acids.

Admittedly, the scale-inhibiting attributes of polymers of ethylenic monoacids are quite good, as are those of the alkali metal polyphosphates. However, when the temperature of the water and also the residence or dwell time of the water in the particular circuit increase greatly, alkali metal polyphosphates lose much of their scale-inhibiting efficacy and it has been ascertained that polymers of ethylenic monoacids become poorer scale inhibitors than polymers of ethylenic diacids.

And whatever the procedure employed for the polymerization of ethylenic monoacids, whatever the transfer agents used and whatever the catalyst selected for the formation of free radicals, polymers are obtained, the scale-inhibiting properties of which are essentially equivalent in each case, but are demonstrably poorer than those of very low molecular weight polymaleic acid.

Thus, by way of example, the scale-inhibiting effectiveness of polymers prepared from ethylenic monoacids is good at moderate temperatures and up to 95° C., but upon reaching the boiling point of the water, and even 101.5° C. in the case of sea water, such scale-inhibiting effectiveness is then poorer than with polymaleic acid.

This rule applies whatever the polymerization system used, namely, persulfate associated with acetic acid, hydrogen peroxide associated with acetic acid or with isopropyl alcohol in larger or smaller amounts, or hydrogen peroxide associated with hydroxylamine sulfate and with isopropyl alcohol. Moreover, in the case of methacrylic acid homopolymer, the viscosities of the resultant products are very high and same are totally inadequate as regards providing good scale-inhibiting characteristics.

SUMMARY OF THE INVENTION

Accordingly, a major object of the present invention is the provision of a novel class of water-soluble polymeric scale inhibitors, which novel polymers are devoid of those disadvantages and drawbacks to date characterizing the state of this art.

Briefly, the novel water-soluble polymers according to this invention are prepared by copolymerizing a minor amount of an alkali metal methallylsulfonate, notably sodium methallylsulfonate, with at least one monoethylenically unsaturated acid selected from the group comprising acrylic acid and methacrylic acid.

DETAILED DESCRIPTION OF THE INVENTION

More particularly according to the present invention, a spectacular improvement in scale-inhibiting efficacy is attained when the subject copolymers are comprised of a mixture containing both acrylic acid and methacrylic acid.

In the more specific case of enhancing scale-inhibiting efficacy utilizing the subject novel polymers, with respect to calcium and magnesium scales, and in the case of both ground water and sea water, it too has been determined that, when such mixtures of acrylic and methacrylic acids are copolymerized, the introduction/incorporation of sodium methallylsulfonate in an amount by weight of less than 20% of the total amount of the acrylic and methacrylic acids is sufficient.

A preferred but non-limiting recipe to prepare a novel water-soluble copolymer having admirable scale-inhibiting characteristics per this invention, is that comprising a comonomer mixture containing approximately equal amounts by weight of acrylic acid and methacrylic acid and from 10 to 18% by weight of the sodium methallylsulfonate.

The polymer compositions according to the invention are useful as scale inhibitors for any aqueous environment, such as underground water, watercourse water or sea water. Typically, a dose or unit amount of 0.2 to 50 mg/liter, and preferably of 1 to 20 mg/liter, is an effective amount.

However, as stated above, the present invention is not to be construed as being limited either to the said specific polymers, or recipes for the preparation thereof, or to the scale-inhibiting characteristics thereof.

The particular method of (co)polymerization can be of any known free-radical type, such as those employing, for example, hydrogen peroxide as the catalyst for the formation of free radicals, in association with isopropyl alcohol, in the presence of a small amount of a copper salt, it also being possible for the latter to be replaced by a given amount of hydroxylamine sulfate, or hydrogen peroxide together with an iron salt (ferrous sulfate) and hydroxylamine sulfate, or also sodium persulfate or ammonium persulfate in the presence of acetic acid.

In order to further illustrate the present invention and the advantages thereof, the following specific examples are given, it being understood that same are intended only as illustrative and in nowise limitative.

In said examples, all of the polymerization recipes were polymerized in accordance with the same procedure and differed only in the proportions and amounts of the respective comonomers and other ingredients.

The procedure for the preparation of those polymers noted in Table I was as follows:

A solution of those comonomers/ingredients listed in the first column of Table I labelled "reaction flask 1" was placed, under a nitrogen blanket, into a 2 liter round-bottomed flask having ground glass necks (the Table I reaction flask 1), which was fitted with a stirrer, a heating sleeve, a nitrogen inlet tube, a monomer inlet tube and a catalyst inlet tube. The deaerated and stirred medium was subsequently heated to reflux temperature and 10% of the comonomers/ingredients listed in said first column of Table I under the heading "introduction flask 2" was then introduced and 12% of the hydrogen peroxide was added. The mixture was again heated to the reflux temperature, under stirring, and the remainder of the comonomers (noted in Table I under the heading "introduction flask 2") and 68% of the hydrogen peroxide were then introduced continuously and concomitantly. This addition of the comonomers and the catalyst was continued for 1 hour, 30 minutes under reflux. 10% of the hydrogen peroxide was subsequently added, the mixture was again maintained under reflux for 30 minutes, the final 10% of the hydrogen peroxide was added, and the mixture was then maintained under reflux for 1 hour, 30 minutes. Same was subsequently distilled in vacuo in order to bring the polymer concentration to about 40 to 50%. The mixture was cooled and the solids content and, if appropriate, the viscosity of the product, were then measured.

TABLE I

| | EXAMPLE | | | 1 | 2 | 3 | 4 | 5 | 6 | 7 | 8 | 9 |
|---|---|---|---|---|---|---|---|---|---|---|---|---|
| 1 | Reaction flask | Demineralized water, | | 200 | 350 | 350 | 350 | 350 | 350 | 200 | 490 | 225 |
| | | Copper acetate, | | 0.5 | 0.5 | 0.5 | 0.5 | 0.5 | 0.5 | 0.5 | 1.3 | 0.5 |
| | | Sodium methallylsulfonate, | | 20 | 10 | 5 | 8 | 8 | 5 | 25 | 0 | 0 |
| | | Isopropanol, | | 50 | 50 | 50 | 50 | 100 | 50 | 0 | 100 | 0 |
| | | Acetic acid | grams of chemical product | 0 | 0 | 0 | 0 | 0 | 0 | 100 | 0 | 100 |
| 2 | Introduction flask | Demineralized water, | | 450 | 450 | 450 | 450 | 450 | 450 | 450 | 160 | 500 |
| | | Acrylic acid, | | 230 | 230 | 230 | 230 | 230 | 0 | 460 | 230 | 460 |
| | | Methacrylic acid, | | 230 | 230 | 230 | 230 | 230 | 460 | 0 | 230 | 0 |
| | | Sodium methallylsulfonate, | | 30 | 40 | 50 | 72 | 50 | 50 | 50 | 0 | 0 |
| | | Copper acetate | | — | — | — | — | — | — | — | 0.9 | — |
| | (Methallylsulfonate/acrylic + methacrylic acids × 100)% | | | 10.87 | 10.87 | 11.95 | 17.4 | 12.6 | 11.95 | 16.3 | — | — |
| 3 | Graduated introduction flask | Hydrogen peroxide of 110 volumes strength (number of ml) | | 100 | 100 | 100 | 100 | 100 | 100 | 100 | 100 | 100 |
| | Solids content at 105 C.° in % of the final polymer, after concentration | | | 48 | 50 | 51 | 50 | 50 | 40 | 51 | 44 | 51 |
| | Brookfield viscosity - 10 rpm (centipoises) of the polymer after concentration - No. 1 spindle | | | 270 | 270 | 1000 | 320 | 240 | 1500 | 120 | — | 150 |

SCALE-INHIBITING EFFICACY:

The scale-inhibiting efficacy was determined by one of the following two tests:

Test for the precipitation of calcium carbonate by boiling hard water:

Procedure:

The water used was an underground water. Its initial properties and characteristics were as follows:

| | | |
|---|---|---|
| pH | 7.3 | |
| Total hardness (TH) | 33 | degrees on the French scale (°F.) |
| Temporary hardness | 21 | degrees on the French scale (°F.) |
| Permanent hardness | 12 | degrees on the French scale (°F.) |
| Total alkalinity (TAC) | 25 | degrees on the French scale (°F.) |
| Resistivity | 1800 | ohm. cm |

150 ml of untreated water, or water treated with the polymers noted in Table I, in amounts of 6 mg/liter, were introduced into a 500 ml ground glass Erlenmeyer flask; three small washed porcelain chips were added thereto. The water was brought to a boil under reflux by means of a heated sand bath. When the boiling commenced, same was maintained for exactly ten minutes. The Erlenmeyer flask containing the water was subsequently cooled under a stream of cold water, the water was then filtered through a 0.45 micron Sartorius filter and the total residual hardness of the water, commonly referred to as the permanent hardness when the water does not contain scale inhibitor, was measured.

The nearer the final hardness (TH) of the water is to its initial total hardness, the better the inhibitor is with respect to the precipitation of calcium carbonate.

A boiling time of 10 minutes was determined.

The results obtained are summarized in Table II:

TABLE II

| Inhibitor (6 mg/liter) | Final hardness of the water (°F.) |
|---|---|
| Control without inhibiting treatment | 12.0 |
| Polymer 1 of Table I | 25.2 |
| Polymer 2 of Table I | 26.7 |
| Polymer 3 of Table I | 27 |
| Polymer 4 of Table I | 26.2 |
| Polymer 5 of Table I | 25.9 |
| Very low molecular weight polymaleic acid | 27.2 |
| Polymer 6 of Table I | 22.0 |
| Polymer 7 of Table I | 20.5 |
| Polymer 8 of Table I | 24.0 |
| Polymer 9 of Table I | 20.5 |
| Low molecular weight polyacrylic acid | 20.0 |
| Monomeric sodium methallylsulfonate | 12.0 |

The improvement in scale-inhibiting efficacy obtained by using polymers 1, 2, 3, 4 and 5 (of Examples 1, 2, 3, 4 and 5, respectively) was significant, in particular in the case of polymer 3, compared with the use of low molecular weight polyacrylic acid (polymer 9) and also compared with the use of acrylic acid/methacrylic acid copolymer devoid of sodium methallylsulfonate (polymer 8).

Scaling test by boiling sea water:

Typically, sea water desalination plants operate by distillation in order to separate pure water from the brackish salts. Without an inhibiting treatment, scaling then takes place, which comprises precipitation of calcium carbonate and a more or less complex carbonate of magnesia or magnesia itself. Good operation of sea water desalination plants thus largely depends on the scale-inhibiting efficacy of the scale inhibitors added.

Procedure:

A synthetic sea water corresponding to Brujewicz's formulation was prepared in the laboratory from distilled water and, according to the *Water Book*, 2nd edition, volume 2, page 249, Cebedoc S.P.R.L. H. Goldstein, 63 Rue Hayeneux (Herstal Lez Liege), from:

| | |
|---|---|
| NaCl | 26.518 g/kg |
| MgCl$_2$ | 2.447 g/kg |
| MgSO$_4$ | 3.305 g/kg |
| CaCl$_2$ | 1.141 g/kg |
| KCl | 0.725 g/kg |
| NaHCO$_3$ | 0.202 g/kg |
| NaBr | 0.083 g/kg |

300 ml of untreated synthetic sea water (control experiment) or synthetic sea water treated with 2 mg/liter of scale inhibitor were introduced into a 500 ml ground glass Erlenmeyer flask; 8 small washed porcelain chips were added thereto. The Erlenmeyer flask was placed in a waterbath regulated at 140° C. in order to accelerate the onset of boiling. The sea water was brought to a boil under reflux, namely, at about 101.5° C. When the boiling commenced, same was maintained for exactly 40 minutes. The Erlenmeyer flask was subsequently cooled for 20 minutes with a stream of cold water. The sea water was filtered through a 0.45μ Sartorius filter under a water pump vacuum.

The scale in suspension, namely, that scale not adhering to the walls of the apparatus, was recovered on the filter; same was rinsed 3 times with 10 ml of double-distilled water, which was used beforehand to rinse the walls of the Erlenmeyer flask in order to remove the traces of sea water adhering to the wall. After drying the filter, the calcium and the magnesium deposited on the filter were dissolved under boil in 3N extra pure hydrochloric acid, and the calcium and the magnesium therefore corresponding to the non-adhering deposit were then determined.

Concurrently, in order to measure the amount of calcium and magnesium adhering to the wall of the Erlenmeyer flask (encrusting scale), the scale was dissolved in the same manner in hydrochloric acid, and the calcium and the magnesium contents were determined.

The results are expressed as total mg of calcium and total mg of magnesium, i.e., as the sum of the calcium and magnesium in suspension, as well as that adhering to the flask walls.

Very severe scaling conditions were adopted in order to differentiate the products more clearly, and an inhibiting amount of 2 mg/liter was used.

The results obtained are summarized in Table III:

TABLE III

| | Total deposit, mg of Ca + mg of Mg |
|---|---|
| Control without inhibitor | 22.7 |
| Low molecular weight acrylic acid | 18.0 |
| Low molecular weight polymaleic acid | 8.0 |
| Polymer 3 of Table I | 9 |

Thus, a significant improvement in scale-inhibiting efficacy consistent with this invention is clearly apparent.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A water-soluble addition copolymer, comprising (i) both recurring acrylic acid and recurring methacrylic acid units and (ii) a minor amount of recurring alkali metal methallylsulfonate units, the amount by weight of said recurring methallylsulfonate units (ii) in said copolymer ranging from 10 to 18% of the total amount of said recurring acrylic acid and recurring methacrylic acid units (i) therein.

2. The water-soluble copolymer as defined by claim 1, said recurring alkali metal methallylsulfonate units (ii) being recurring sodium methallylsulfonate units.

3. The water-soluble copolymer as defined by claim 1, said recurring units (i) comprising essentially equal amounts by weight of said acrylic and methacrylic acids.

* * * * *